United States Patent
Yamashita et al.

(10) Patent No.: US 8,159,629 B2
(45) Date of Patent: Apr. 17, 2012

(54) LIQUID CRYSTAL DISPLAY UNIT

(75) Inventors: Yoshiharu Yamashita, Yokohama (JP); Akitoshi Morishima, Kawasaki (JP); Katsunari Sato, Toda (JP); Noriyo Nishijima, Abiko (JP); Shigeo Ohashi, Tsuchiura (JP); Takeshi Miitsu, Isehara (JP); Hiroyoshi Ogura, Isehara (JP); Hiroki Hosono, Isehara (JP); Koichi Sato, Isehara (JP)

(73) Assignee: Hitachi, Ltd., Tokyo (JP)

( * ) Notice: Subject to any disclaimer, the term of this patent is extended or adjusted under 35 U.S.C. 154(b) by 412 days.

(21) Appl. No.: 12/473,459

(22) Filed: May 28, 2009

(65) Prior Publication Data

US 2010/0066937 A1 Mar. 18, 2010

(30) Foreign Application Priority Data

| Sep. 18, 2008 | (JP) | 2008-238803 |
| Sep. 18, 2008 | (JP) | 2008-238821 |
| Apr. 16, 2009 | (JP) | 2009-099520 |

(51) Int. Cl.
*G02F 1/1333* (2006.01)
*G02F 1/1335* (2006.01)

(52) U.S. Cl. ............... 349/58; 349/62; 349/65

(58) Field of Classification Search .............. 349/58–60, 349/62, 64, 65
See application file for complete search history.

(56) References Cited

U.S. PATENT DOCUMENTS

| 5,619,351 | A | 4/1997 | Funamoto | |
| 6,822,721 | B2 | 11/2004 | Fujiwara | |
| 7,488,104 | B2 * | 2/2009 | Hamada et al. | 362/616 |
| 7,513,661 | B2 * | 4/2009 | Hamada et al. | 362/373 |
| 7,864,258 | B2 * | 1/2011 | Cho et al. | 349/58 |
| 7,894,016 | B2 * | 2/2011 | Hamada | 349/58 |
| 2005/0073626 | A1 | 4/2005 | Yeom | |
| 2005/0157500 | A1 * | 7/2005 | Chen et al. | 362/294 |
| 2006/0070280 | A1 * | 4/2006 | Yamamura et al. | 40/564 |
| 2006/0104067 | A1 * | 5/2006 | Hwang et al. | 362/373 |

(Continued)

FOREIGN PATENT DOCUMENTS

EP 0607453 A1 7/1994

(Continued)

OTHER PUBLICATIONS

European Search Report dated for EPO patent application EP09251394.4 (Jul. 28, 2010).

*Primary Examiner* — Rhonda Peace
(74) *Attorney, Agent, or Firm* — Kilpatrick Townsend & Stockton LLP

(57) ABSTRACT

There is provided a slim liquid crystal display unit having a large screen by providing a slim structure capable of sufficiently radiating the heat from a light source. The liquid crystal display unit according to the present invention includes: a liquid crystal panel; an optical guiding board installed on a rear face thereof; a pair of light source-mounted substrate disposed, opposing right and left side faces thereof; a light source mounted on the light source-mounted substrate; a metal frame connected on the opposite side to the optical guiding board of the light source-mounted substrate; a chassis member for supporting the optical guiding board and a reflection sheet group; and a thermal diffusion member fixed onto the metal frame along with the chassis member. The chassis member has a stepped portion in the vicinity of the light source. Between the stepped portion and the reflection sheet group, a thermal insulation member is attached.

20 Claims, 10 Drawing Sheets

U.S. PATENT DOCUMENTS

| | | |
|---|---|---|
| 2006/0132699 A1* | 6/2006 | Cho et al. .................. 349/161 |
| 2006/0243948 A1* | 11/2006 | Ishiwa et al. ............ 252/299.61 |
| 2007/0153548 A1 | 7/2007 | Hamada et al. |
| 2008/0205078 A1* | 8/2008 | Karlicek et al. ............ 362/612 |
| 2008/0205080 A1 | 8/2008 | Erchak et al. |
| 2009/0128732 A1 | 5/2009 | Hamada |
| 2010/0027296 A1 | 2/2010 | Hamada |

FOREIGN PATENT DOCUMENTS

| | | |
|---|---|---|
| GB | 2430071 A | 3/2007 |
| JP | 06-051307 A | 2/1994 |
| JP | 11-24072 A | 1/1999 |
| JP | 2003-288022 A | 10/2003 |
| JP | 2006-066328 A | 3/2006 |
| JP | 2006-156324 A | 6/2006 |
| JP | 2006-227074 A | 8/2006 |
| JP | 2006-310221 A | 11/2006 |
| JP | 2006-330599 A | 12/2006 |
| JP | 2008-047396 A | 2/2008 |
| JP | 2008-153165 A | 7/2008 |
| JP | 2008-165101 A | 7/2008 |
| WO | WO2007/129419 A1 | 11/2007 |
| WO | WO2008/090642 A1 | 7/2008 |
| WO | WO2008/103437 A1 | 8/2008 |

* cited by examiner

| MATERIAL | LINEAR EXPANSION COEFFICIENT ($10^{-6}$/K) |
|---|---|
| ALUMINUM | 23~24 |
| PET | APPROX. 60 |
| PC | APPROX. 70 |
| ACRYL | APPROX. 70 |

LIQUID CRYSTAL DISPLAY UNIT

INCORPORATION BY REFERENCE

The present application claims priorities from Japanese applications JP 2008-238821 filed on Sep. 18, 2008, JP 2008-238803 filed on Sep. 18, 2008, JP 2009-099520 filed on Apr. 16, 2009, the contents of which are hereby incorporated by reference into this application.

BACKGROUND OF THE INVENTION (1) Field of the Invention

The present invention relates to a liquid crystal display unit having an edge light (side light) type backlight. In particular, the present invention relates to a liquid crystal display unit having good optical properties by improving light extraction efficiency and inhibiting deterioration of an optical member.

(2) Description of the Related Art

The liquid crystal display unit displays an image by controlling the optical transparency of a large number of pixels formed behind a liquid crystal panel face. The liquid crystal panel has no own light emission function and a liquid crystal display unit, generally referred to as "transmission type", is provided with a light source called a "backlight" and the light emitted from the backlight is spread onto a rear face side of a liquid crystal panel.

The following two types of backlight are available: one type in which a large number of light sources are distributedly arranged on a rear face side of a liquid crystal panel display face, hereinafter referred to as "direct type" and another type in which a light source is attached to at least one end portion of a liquid crystal panel, hereinafter referred to as "edge light type".

The edge light type, in which a light source is attached to an end portion of a liquid crystal panel, has an advantage in the slimness of a liquid crystal display unit over the direct type. However, the edge light type, having light sources generating much heat concentratedly arranged on the edges, tends to cause an end portion of the proximity of the light source of an optical component such as a light source or an optical guiding board to have a high temperature. Temperature rise in these portions causes degradation in optical properties due to thermal factors, such as decrease in lifetime of a light source, display uniformity of a liquid crystal panel, and thermal deterioration of an optical guiding board, which therefore need to be suppressed by a cooling structure. Additionally, the cooling structure preferably has high assemblability, and requires that the light from the light source is effectively made incident into the optical guiding board and directed toward the liquid crystal panel or that there is not such a side effect as degradation in optical properties due to any factor except heat.

As a cooling structure of the edge light type, for example, JP-A-6-51307 discloses a structure using a cold-cathode tube as a light source. This structure has such an effect that the heat from the light source of the cold-cathode tube is diffused by a thermal conduction layer provided on a rear face and a high temperature of an end portion is relieved. At the same time, a reflective layer is formed around the cold-cathode tube. Further, this structure is configured to effectively make the light from the cold-cathode tube incident into the optical guiding board while cooling.

In addition, as a light source of an edge light (side light) type backlight for applying light from right/left or top/bottom end side of a liquid crystal panel, use of a light emitting diode (LED) for the liquid crystal panel has been conventionally known.

For example, JP-A-2006-310221 discloses a structure using light sources arranged with LEDs (light-emitting diodes) in an array manner. According to this structure, a LED module in which a large number of LEDs are arranged on a slender substrate is disposed on a metal p-board bent in a 3-D manner. The metal p-board is formed by printing an insulating layer and a wiring copper foil on a metal plate and cools a light source by diffusing the heat of the light source onto the metal p-board. The portion of the metal p-board bent in a 3-D manner has a reflection board, which effectively makes the light from LED incident into an optical guiding board.

Further, for example, JP-A-2006-156324 (refer to FIGS. 39 to 41) discloses the following conventional technique of such a backlight: an optical guiding board is disposed on a rear face side of a liquid crystal panel and a LED is disposed at a side face position of the optical guiding board. Further, the above Patent Document describes a configuration in which the heat generated by LED is transferred from a light source-mounted substrate (light source fixing member) to a rear face side of a liquid crystal display unit by an L-type thermal conduction member, then transferred to a heat sink for radiation.

SUMMARY OF THE INVENTION

As a light source for the edge light type, a cold-cathode tube or a LED (light-emitting diode) is generally used, as disclosed in JP-A-6-51307 and JP-A-2006-310221 described above. The cold-cathode tube, being capable of emitting a large quantity of light at a relatively low cost, is mainly used in a large-sized liquid crystal display unit for a television set, a computer or the like. On the other hand, LED is mainly used in a small-sized liquid crystal display unit for an information terminal, a mobile phone or the like, which requires small-sized packaging and therefore only a small quantity of light.

However, in recent years, light-emitting efficiency of LED has been improved and a LED light source of edge light type is applicable to a large-sized liquid crystal display unit. Application to a large-sized liquid crystal display unit using LED provides the following advantages: Firstly, a light-emitting element of LED, being smaller than a cold-cathode tube, enables further slimness of a liquid crystal display unit. Secondly, a LED light source is a light source in which many light-emitting devices are aligned in an approximately linear manner and can control the quantity of light by the light-emitting device or by the unit formed from a plurality of light-emitting devices. This enables the quantity of light to be locally controlled according to conditions of a display image, thus attaining reduction in power consumption and high overall contrast ratio. Thirdly, a combination of light-emitting devices of red, green and blue as the LED light source provides high color duplicability.

As described above, use of an edge light type LED light source can realize a large-sized liquid crystal display unit capable of attaining further slimness and an output of an image having higher quality.

However, use of structures disclosed in JP-A-6-51307 and JP-A-2006-310221 cause the following problems in attaining a large-sized liquid crystal display unit having an edge light type LED light source.

The structure disclosed in JP-A-6-51307, using a cold-cathode tube, allows such a reflective layer and a thermal conduction layer to be formed so as to surround a light source, however, in use of a LED light source, this formation is difficult. Specifically, the cold-cathode tube, the inside of which is at a very high temperature as a light-emitting source, can widely transmit and diffuse generated heat to the thermal conduction layer around the light source mainly by radiant heat transfer. However, the LED light source relies on solid-state emission and the temperature thereof is lower than that of a light-emitting portion of the cold-cathode tube and radiation heat transfer can be hardly expected; therefore heat must be transferred, mainly by solid heat transfer.

Accordingly, only by replacing the cold-cathode tube by a LED light source using the structure disclosed in JP-A-6-51307, a LED light source is difficult to cool. In addition, it may be supposed that heat is diffused to a thermal conduction layer by fixing a LED light source on a reflective layer in some way using this structure, however, the reflective layer at which the LED light source is fixed becomes a thermal resistance and thermal diffusion from the LED light source to the thermal conduction layer is impeded and hence the LED light source cannot be effectively cooled. Temperature rise in the LED light source causes degradation in light-emitting efficiency, in addition to degradation in reliability thereof and shortening of device lifetime, and therefore even if the degradation in reliability is allowable, power consumption will increase.

Further, although an increase in the quantity of light in rough proportion to an area is required for the same display brightness when a display screen size is enlarged, the edge light type is provided with a light source on an end portion thereof and therefore a layout region of the LED light source in a roughly linear shape increases only in proportion to a length thereof. Accordingly, in the case of a large-sized liquid crystal display unit, a LED device is required to be packaged in a higher density or the quantity of light per LED device is required to be increased. In either case, a heat generation density increases at a LED light source portion. Accordingly, in the large-sized liquid crystal display unit, the LED light source portion tends to have a higher temperature.

Therefore, in the structure disclosed in JP-A-6-51307, even if degradation in the reliability of the LED light source or an increase in power consumption is allowable, the high temperature transmitted to the thermal conduction layer is transmitted to an optical guiding board in a diffusion process and particularly, an end portion of the optical guiding board has a high temperature. As the optical guiding board, a plate formed by surface-treating acrylic resin having high optical properties is generally used, however, an end portion thereof has a high temperature and the resin is deteriorated due to alteration and softening and thereby the optical properties of the optical guiding board are degraded.

In the structure disclosed in JP-A-2006-310221, a LED light source is assumed and heat is diffused onto a metal p-board to cool the LED light source. In this case, heat is effectively transferred from the LED light source to the metal p-board, however, when the liquid crystal display unit is enlarged, the heat generation density of the light source increases as disclosed in JP-6-51307 and only thermal diffusion onto the metal p-board causes insufficient cooling performance of the light source. Accordingly, the LED light source and the metal p-board have a high temperature, respectively, thus causing degradation in the reliability of the light source and an increase in power consumption, in the same way as for the structure disclosed in JP-6-51307. Further, the metal p-board which has a high temperature causes an end portion of an optical guiding board to have a high temperature, thus degrading optical properties.

As described above, in structures disclosed in JP-A-6-51307 and JP-A-2006-310221, the light from a light source to be efficiently made incident into an optical guiding board. However, in a case where such structures are applied to a large-sized liquid crystal display unit, the cooling performance of a LED light source becomes insufficient, which causes not only degradation in the reliability of the light source or an increase in power consumption, but also further problems of heating of an end portion of the optical guiding board and degradation in optical properties due to the heating.

Further, in recent years, there are increasing needs for slimness and use of a large screen in a liquid crystal display unit. In the configuration described in JP-A-2006-156324, a heat sink as a radiating device is disposed on the rear face side of the liquid crystal display unit and therefore slimness of the liquid crystal display unit is difficult.

To ensure predetermined brightness and to accommodate use of a large screen, more light sources (LEDs) are needed, thereby increasing heat generated by an LED. Therefore, for higher radiation performance, enlargement of the heat sink is needed. Accordingly, the invention described in JP-A-2006-156324 has a disadvantage of interference with further slimness in enlarging a screen of a display unit.

It is therefore an object of the present invention to provide a liquid crystal display unit having good optical properties, capable of efficiently making the light from a light source incident into an optical guiding board and, even in a large-sized liquid crystal display unit, of effectively cooling a LED light source and inhibiting degradation in optical properties due to heating. In addition, the present invention provides a suitable technology for thinning a liquid crystal display unit and enlarging a screen thereof.

Further, according to the present invention, there is provided a liquid crystal display unit with a liquid crystal panel including: a light source disposed on an end side of the liquid crystal panel to apply light from the end side toward a center side of the liquid crystal panel; an optical guiding board disposed on a rear face side of the liquid crystal panel and guiding the light from the light source to a display face side of the liquid crystal panel; a chassis member disposed on a rear face side of the optical guiding board and supporting the optical guiding board; and a thermal conductor for transferring the heat of the light source to the chassis member, in which a thermal insulation member is attached between a predetermined region on an end side of the chassis member and the optical guiding board.

With such a configuration, the present invention can significantly protect an optical guiding board from the heat transferred from a light source to a chassis member through a thermal insulation member.

A liquid crystal display unit of the present invention includes: a liquid crystal panel; a LED light source provided on at least one end portion of a display face thereof; a LED light source block provided with the LED light source; an optical guiding board guiding, to the liquid crystal panel, the light from the LED light source provided on a rear face side of the liquid crystal panel; a reflection sheet provided on a rear face side of the optical guiding board; and a chassis member for fixing the LED light source block and retaining the optical guiding board and the reflection sheet from a back face side. Further, the liquid crystal display unit also includes at an end portion on which the LED light source block of the chassis member is disposed: a protrusion portion protruding to a back face side of the liquid crystal unit, extending at least from the LED light source block to at least parts of the optical guiding board and the reflection sheet; and a reflective thermal insulation member provided on the protrusion portion and fixed to the chassis member, extending from the end portion of the LED light source block to at least parts of the optical guiding board and the reflection sheet.

The reflective thermal insulation member may have a reflecting surface formed on a face opposing to the liquid crystal panel and a thermal insulation layer formed on a side where the thermal insulation member is fixed on the chassis member.

The reflective thermal insulation member may be constructed from a laminated body of the reflection sheet and the thermal insulation member. The reflective thermal insulation member may have a reflecting surface formed on a face opposing to the liquid crystal panel and may have a hollow portion on at least a part of a side where the thermal insulation member is fixed onto the chassis member. Further, the reflective thermal insulation member may come into contact with the optical guiding board and the reflection sheet in a slidable manner.

As described above, the present invention provides a slim liquid crystal display unit adaptable to a large screen.

According to the present invention, a protrusion portion, provided on a chassis member, extending to at least parts of an optical guiding board and a reflection sheet and a reflective thermal insulation member, provided on the protrusion portion, extending from an end portion of the LED light source block to at least parts of the optical guiding board and the reflection sheet and fixed on the chassis member. Such a structure provides a liquid crystal display unit having good optical properties, which can efficiently make the light from a light source incident into the optical guiding board and effectively cool the LED light source for inhibiting degradation of optical properties due to heat, even in a large-sized liquid crystal display unit.

Other objects, features and advantages of the invention will become apparent from the following description of the embodiments of the invention taken in conjunction with the accompanying drawings.

DETAILED DESCRIPTION OF THE EMBODIMENT

An embodiment of the present invention will be described with reference to the accompanying drawings.

First Embodiment

Figure 1:
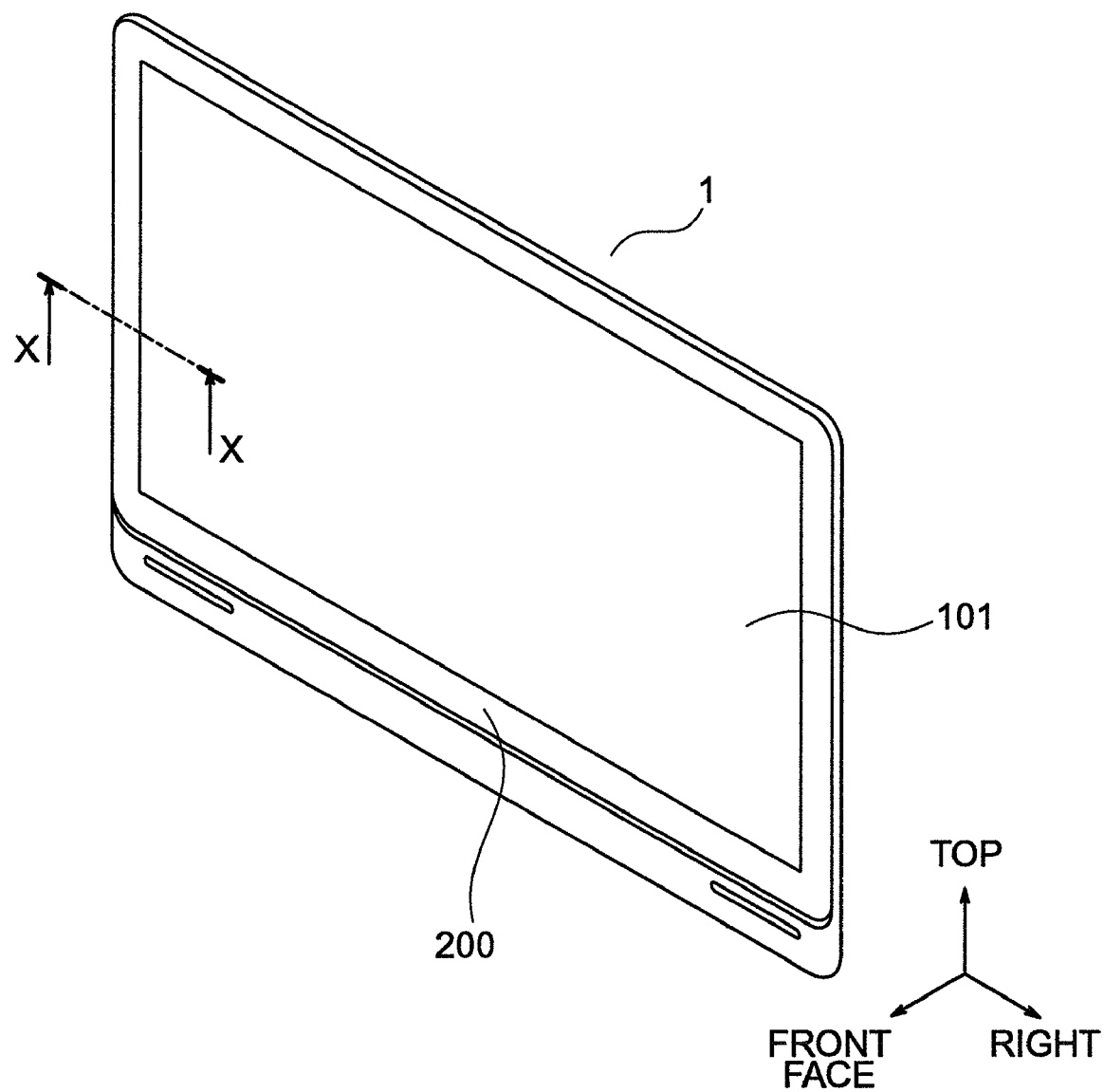
FIG. 1 is a perspective view of a liquid crystal display unit according to an embodiment of the present invention.

FIG. 1 is a perspective view of a liquid crystal display unit according to an embodiment of the present invention. A liquid crystal display unit 1 includes a liquid crystal panel 101 and an appearance frame 200 which is a housing surrounding a circumference thereof. For the purpose of description, a top and a bottom and a front face and a rear face thereof are defined with respect to a display screen of the liquid crystal panel 101. Specifically, when a user who views the liquid crystal display unit 1 opposes the display screen of the liquid crystal panel 101, the display screen side which is a front side is defined as "front face", the deep side is defined as "rear face" and the right side and the left side of the liquid crystal panel in a horizontal direction toward the user are defined as "right" and "left" respectively. In addition, the top side and the bottom side of the liquid crystal panel in a perpendicular direction toward the user are defined as "top" and "bottom" respectively. On the rear face side of the liquid crystal panel 101, a rear face cover (not illustrated) is disposed.

Figure 2:
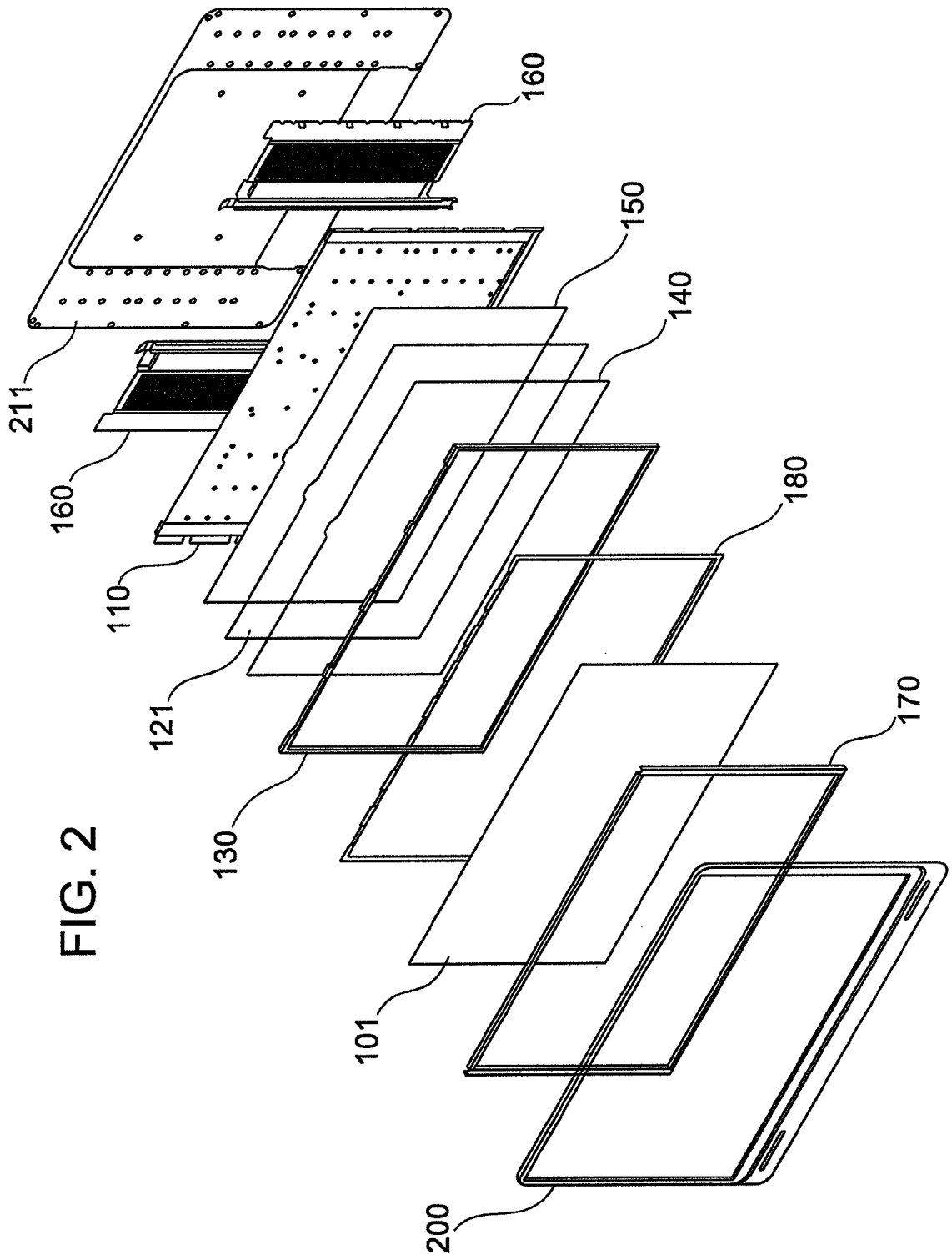
FIG. 2 is an exploded view of FIG. 1.

FIG. 2 is an exploded perspective view of the liquid crystal display unit 1. The liquid crystal display unit 1 according to the present embodiment includes an appearance frame 200, a first panel support 170, a liquid crystal panel 101, a second panel support 180, a light source unit 130, an optical sheet group 140, an optical guiding board 121, a reflection sheet group 150, an optical guiding board support 110, a radiation unit 160 and a rear face cover 211. The function and operation of each member will be described later. The radiation unit 160, as illustrated, is divided to the right and left.

Figure 3:
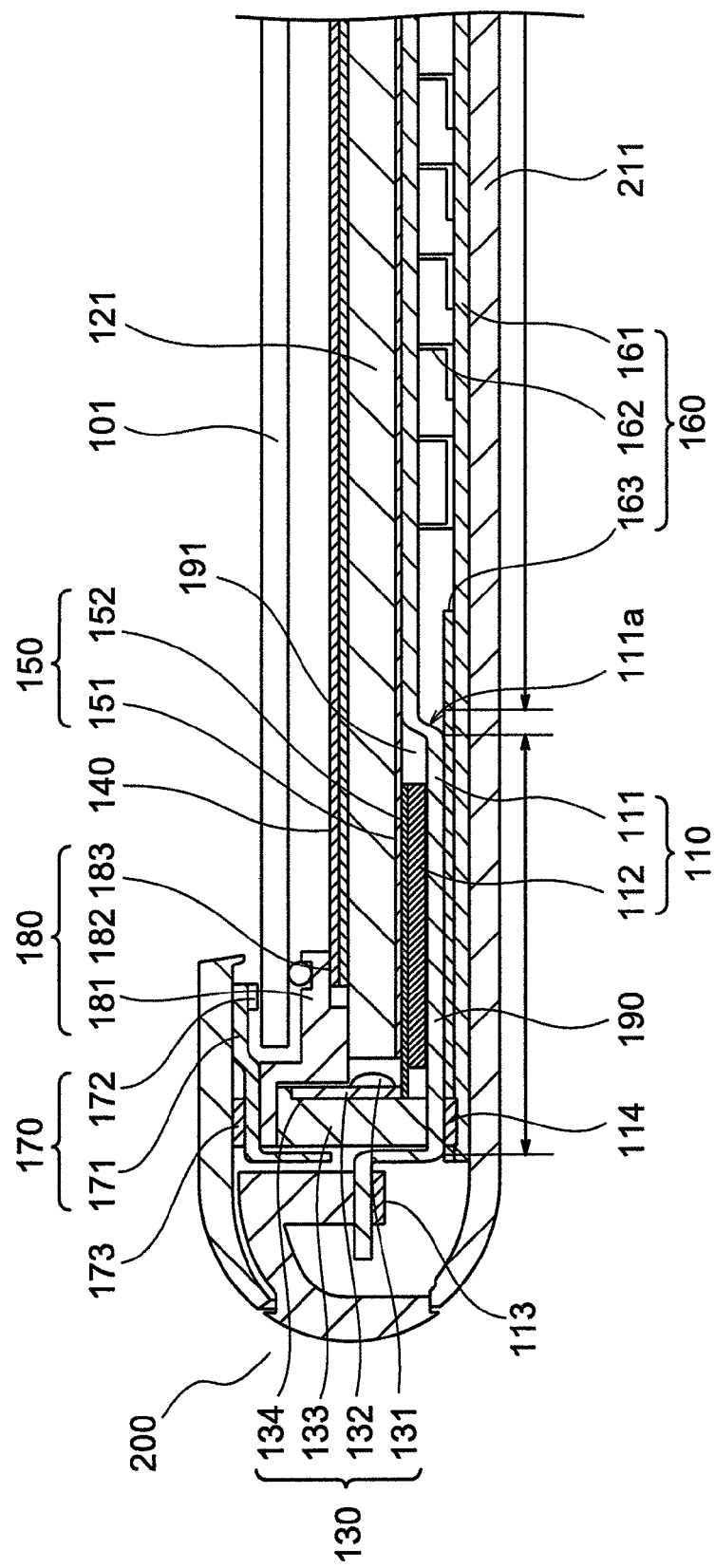
FIG. 3 is a sectional view taken along line X-X in FIG. 1.

The liquid crystal display unit 1 according to the present embodiment is provided with an edge light type backlight. A concrete example of the backlight according to the present embodiment is illustrated in FIG. 3. FIG. 3 is a sectional view along line X-X in FIG. 1. The optical guiding board support 110 includes a chassis member 111 and a thermal insulation member 112. The light source unit 130 includes a light source 131, a light source-mounted substrate 132, a metal frame 133 which is a thermal conductor and a thermal conduction adhesive member 134. The reflection sheet group 150 includes a first reflection sheet 151 and a second reflection sheet 152. The radiation unit 160 includes a thermal diffusion member 161, fins 162 and a radiation frame 163. The first panel support 170 includes a first frame 171 and a first cushion 172 and the second panel support 180 includes a second frame 181, a second cushion 182 and a third reflection sheet 183.

In the present embodiment, the light source unit 130 is disposed on both right and left ends of the liquid crystal panel 101 as illustrated. The light source 131 of the light source unit 130 includes a plurality of light emitting diodes (LEDs) and is constructed by arranging, for example, a plurality of sets of red, blue and green LEDs in a vertical direction (depth direction of paper face). The LEDs may be white LEDs and may be configured to emit white light from two different colors (e.g. yellow, blue). FIG. 3 illustrates a cross section of the liquid crystal display unit 1 on only one side, but a cross section thereof on the other side has a symmetrical configuration. The present embodiment illustrates an example where the light source unit 130 is disposed on both right and left ends of the liquid crystal panel 101, but the present invention is also applicable to a case where the light source unit 130 is disposed at only one of the right and left ends. In addition, the present invention is also applicable to a backlight having such a configuration that the light source unit 130 is disposed at both or either of upper and lower ends thereof.

Next, the arrangement and function of each component will be described from the front face side. An appearance frame 200 is arranged from the front face to the side face of the liquid crystal panel 101 and has a function as a front cover of the liquid crystal display unit 1. In addition, the appearance frame 200 has such a shape that a display area portion of the liquid crystal panel 101 is open. At an edge of the appearance frame 200 on the rear face side, the chassis member 111 is retained by a fixing screw 113.

The liquid crystal panel 101 is of such a configuration that a liquid crystal is sandwiched between two substrates and has a function as a light shutter for controlling transmission/shut-off of the light emitted from the optical guiding board 121 by liquid crystal on/off.

Further, the liquid crystal panel 101 is sandwiched between the rectangular-framed first panel support 170 and the rectangular-framed second panel support 180.

The first panel support 170 is disposed on the front face side of the liquid crystal panel 101 and is constructed from the rectangular-framed first frame 171 and the rectangular-framed first cushion 172. The second panel support 180 is disposed on the rear face side of the liquid crystal panel 101 and is constructed from the rectangular-framed second frame 181, the rectangular-framed second cushion 182 and the third reflection sheet 183 bonded to the rear face side of the second frame 181.

Accordingly, between an opening edge rear face side of the first frame 171 and an edge of the front face of the liquid crystal panel 101, the first cushion 172 is placed. Between an edge of the rear face of the liquid crystal panel 101 and an edge of the front face of the second frame 181, the second cushion 182 is placed. By elastically pressing the liquid crystal panel 101 from both of the front face side and the rear face side, the liquid crystal panel 101 is supported by the first frame 171 and the second frame 181.

The first frame 171 and the second frame 181 are constructed from metal plate made of, for example, stainless steel, aluminum (Al), and are fixedly retained, by a fixing screw 173, on a metal frame 133, which will be described later. At this time, the first cushion 172 and the second cushion 182 have a function as a buffering material.

Figure 4:
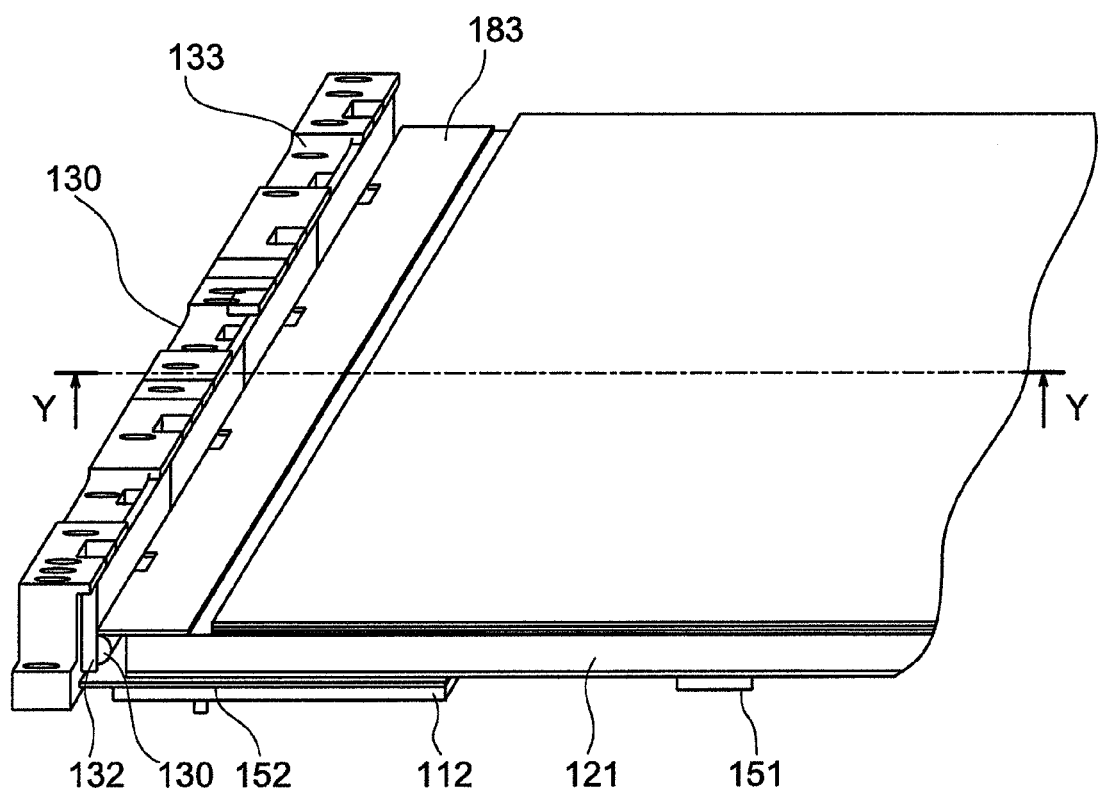
FIG. 4 is a perspective view of an optical guiding board and a light source unit (a part of a structural member omitted for convenience)
Figure 5:
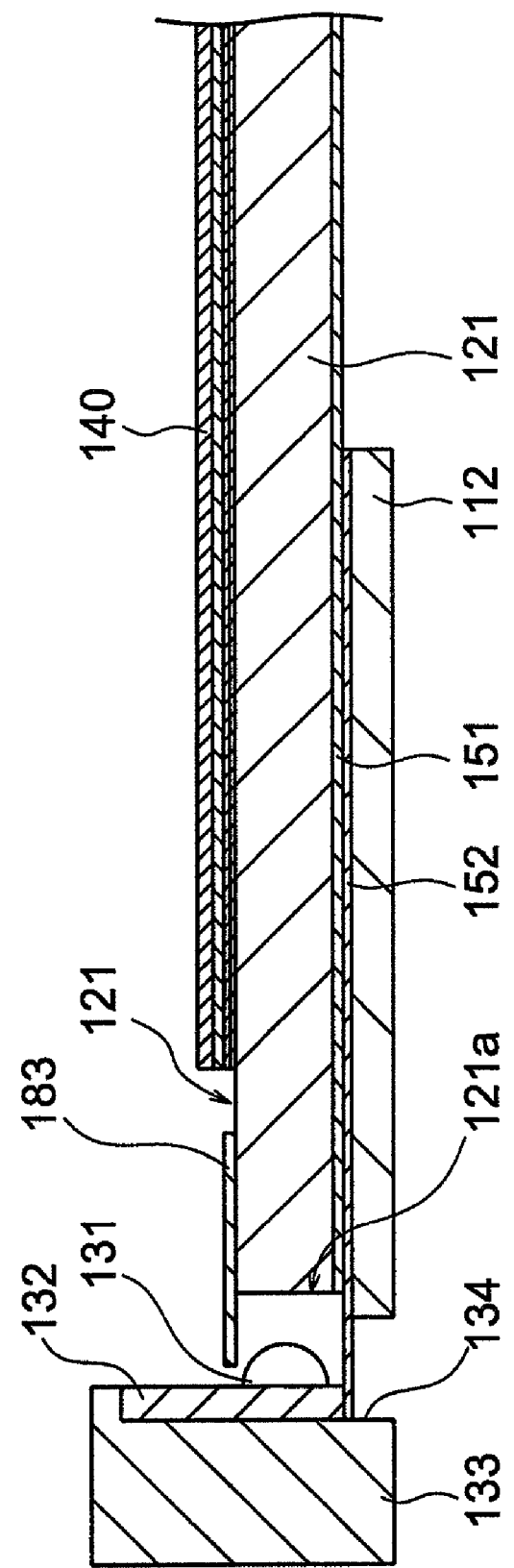
FIG. 5 is a sectional view taken along line Y-Y in FIG. 4.

Referring next to FIGS. 4 and 5, the vicinity of the light source unit 130 will be described below. FIG. 4 is a perspective view of the optical guiding board and the light source unit. Any structural members little affecting optical guiding are omitted for convenience. FIG. 5 is a sectional view taken along line Y-Y in FIG. 4.

The light source unit 130 is constructed from the light source (LED) 131, the light source-mounted substrate 132, the metal frame 133 and the thermal conduction adhesive member 134.

In the present embodiment, the plurality of light sources 131 are arranged in a vertical direction and are configured or disposed to emit the light for video display in a horizontal direction (right/left direction) of the liquid crystal panel 101, from right and left ends of the liquid crystal panel 101 toward the center side. The light source 131 arranged in one line in a vertical direction is molded into an approximately half-cylindrical shape from transparent resin and the molded approximately-half-cylindrical transparent resin constructs a lens.

The light source-mounted substrate 132 is disposed at the right and left side faces of the liquid crystal display unit 1 and, on the substrate, there are arranged the plurality of light sources 131 in one line in a longitudinal direction (vertical direction) of the light source-mounted substrate 132.

In addition, the light source-mounted substrate 132 is constructed from, for example, ceramic substrate, mounted with the light sources 131 and supplies current/voltage to the light sources through a wiring pattern formed on the light source-mounted substrate 132. Further, the light source-mounted substrate 132 also has a function as a reflection board for guiding the light emitted from the light source 131 to the optical guiding board 121 with high efficiency. The material of the light source-mounted substrate 132 is not limited to ceramic. It is sufficient to use resin, if the resin is any material having high light reflection efficiency and high thermal conductivity and excellent electrical insulation properties.

The metal frame 133 as a thermal conductor is made of, for example, aluminum and is bonded to the light source-mounted substrate 132 using the thermal conduction adhesive member 134 (e.g. thermal conduction adhesive or silver paste).

The optical guiding board 121 is made of transparent resin such as acrylic and has a function for converting the light emitted from the light source 131 into a face light source. The light incident into an incoming surface 121a of the optical guiding board 121 is totally reflected and transmitted inside the optical guiding board 121, scattered by a reflection dot printed on the rear face of the optical guiding board 121 and emitted from an outgoing surface 121b of the optical guiding board 121 toward the front face side of the liquid crystal display unit 1. Between the incoming surface 121a of the optical guiding board 121 and the light source 131, a horizontal space is formed for both of them to be in no contact with each other even in a case where the optical guiding board 121 expands due to the heat generated by the light source 131.

The optical sheet group 140 includes one or more optical sheets (diffusion sheet, reflection sheet, etc.), is disposed on the rear face side of the second frame 181 and has a directivity providing function for further in-plane uniformity of the light emitted from the optical guiding board 121 or higher brightness in a front side direction.

The reflection sheet group 150 is constructed from the first reflection sheet 151 and the second reflection sheet 152. The reflection sheet has a function which reflects, before incidence, the light not incident into the incoming surface 121a, of the light emitted from the light source 131 for high optical utilization efficiency and a function which returns the light scattered by the reflection dot, deviated from total reflection conditions and emitted to the rear face side of the optical guiding board 121, to the optical guiding board 121 again. Accordingly, the reflection sheet is disposed, adjacent to the rear face side of the optical guiding board 121.

Similarly, the third reflection sheet 183 has a function which reflects, before incidence, the light not directly incident into the incoming surface 121a of the optical guiding board 121, of the light emitted from the light source 131. The third reflection sheet 183 is bonded to the rear face side of the second frame 181, but the second frame 181 is not illustrated herein for description.

Referring to FIG. 3, the optical guiding board support 110 will be described below.

The optical guiding board support 110 is constructed from the chassis member 111 and the thermal insulation member 112. The chassis member 111 is disposed on the rear face side of the reflection sheet group 150, constructed from metal plate made of, for example, copper, aluminum (Al), and is fixedly retained, by a fixing screw 113, on the appearance frame 200. The chassis member 111 is fixedly retained, by a fixing screw 114, on the metal frame 133 along with the radiation frame 163. In addition, the chassis member 111 supports the first reflection sheet 151 and the optical guiding board 121 from the rear face side and prevents the first reflection sheet 151 and the optical guiding board from being warped.

In the present embodiment, as illustrated in FIG. 3, a portion in the vicinity of the light source 130 of the chassis member 111, specifically, a predetermined region from the end of the chassis member (taken as a region A herein), is formed with a protruding portion 190 in such a manner as to protrude to the rear face side of the liquid crystal display unit 1. By the protrusion, there is formed a space 191 between the optical guiding board 121 (and the reflection sheet group 150) and the chassis member 111. In the present embodiment, the thermal insulation member 112 is disposed in the space 191. In the region A illustrated in FIG. 3, the chassis member 111 is configured to be in no direct contact with the reflection sheet group 150. Hence, transmission of heat transferred to the chassis member 111 from the light source 130 is restrained from being transferred to the optical guiding board 121 and the reflection sheet group 150, thus protecting the optical guiding board 121 and the reflection sheet group 150 from the heat of the light source 130. Further, by forming a stepped portion 111a at the chassis member 111, the chassis member 111 is configured to directly retain the optical guiding board 121 and the reflection sheet group 150 in a region B including a center portion of the chassis member 111. A region A herein includes portions (end portions) of the optical guiding board 121 and the reflection sheet group 150 on the light source 130 side.

The rear face cover 211 is disposed at the rearmost face of the liquid crystal display unit to protect the rear face of the liquid crystal display unit 1. At the lower side face, a vent hole for intake is formed and, at the upper side face, a vent hole for exhaust is formed. Further, the rear face cover 211 is fixedly retained on the appearance frame 200 by a screw (not illustrated).

Figure 6:
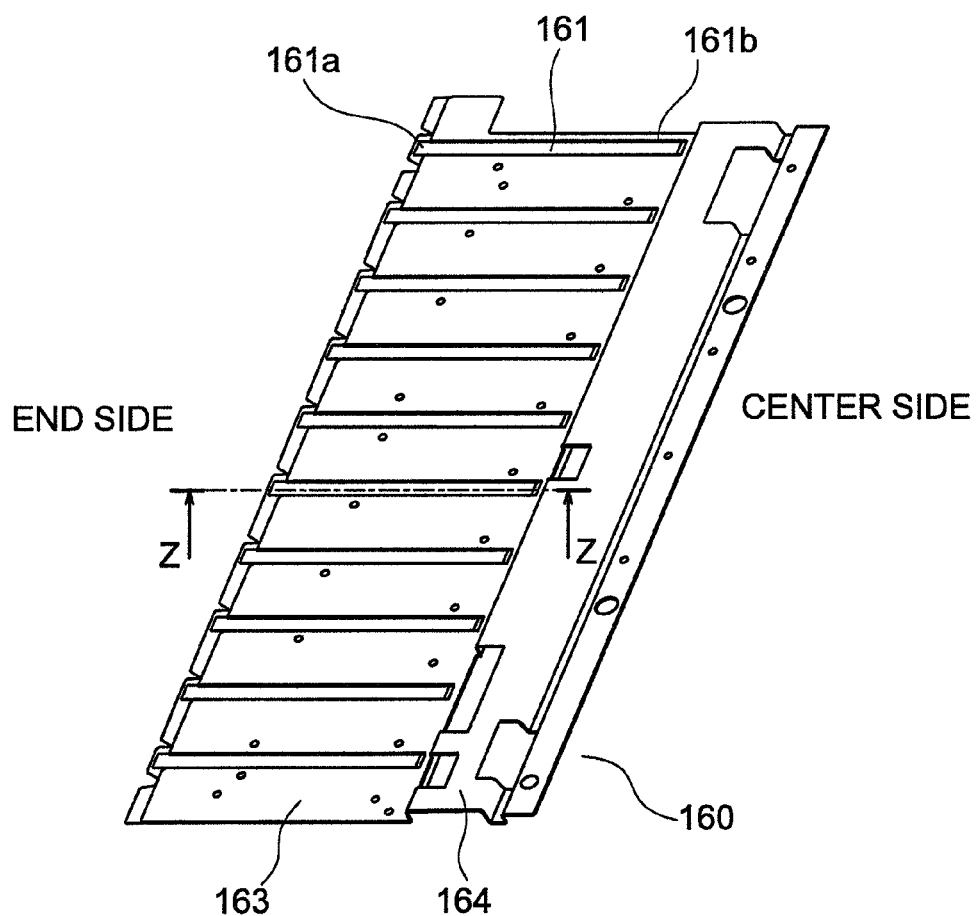
FIG. 6 is a perspective view of a radiation unit.
Figure 7:
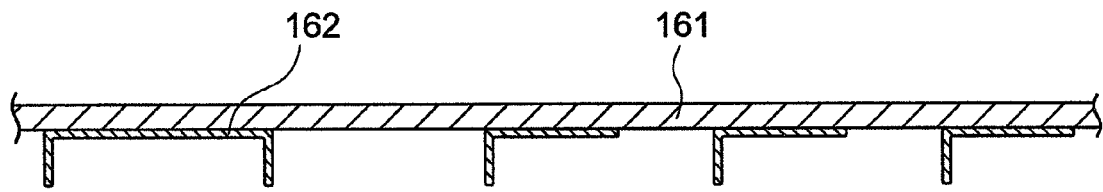
FIG. 7 is a sectional view taken along line Z-Z in FIG. 6.
Figure 8:
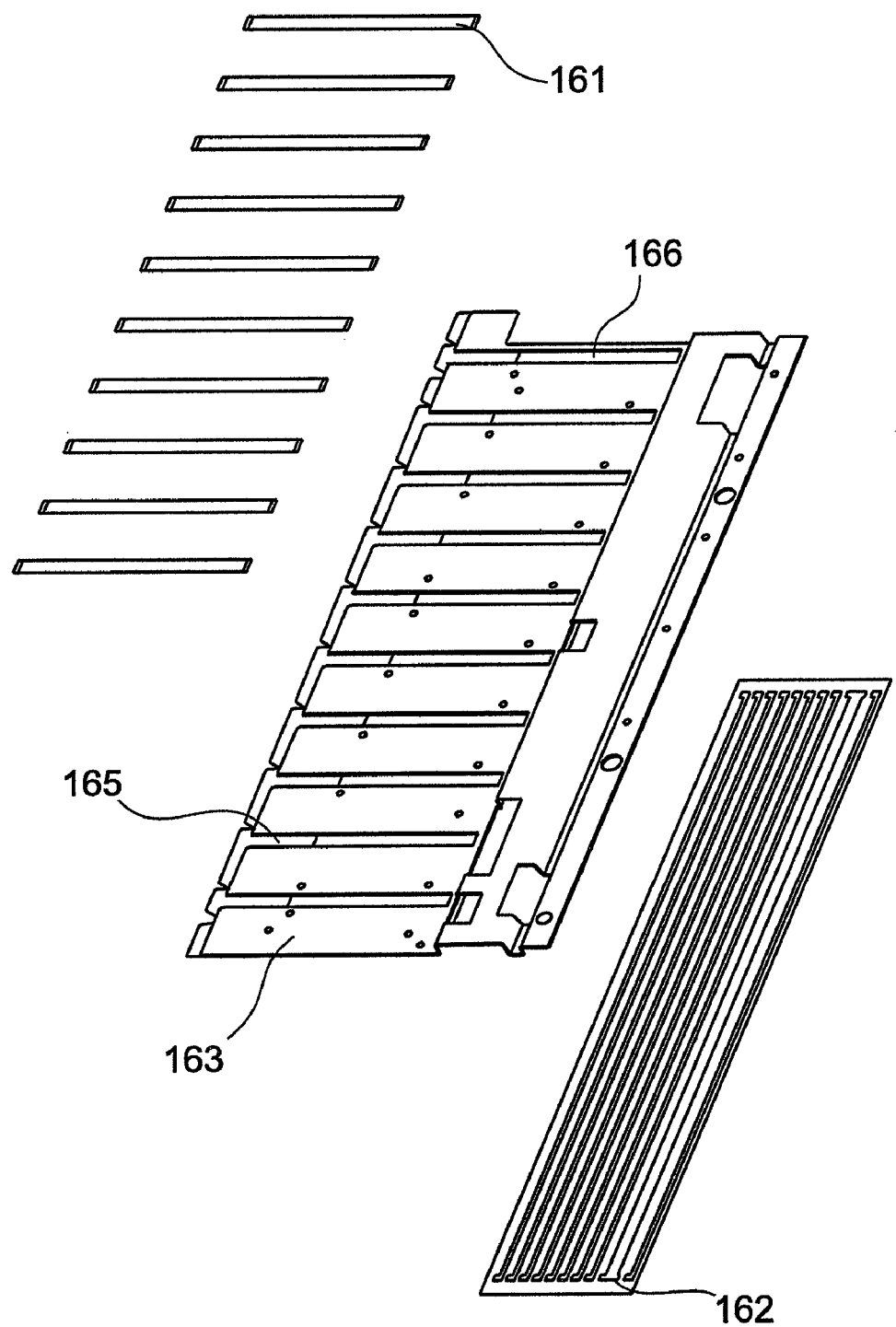
FIG. 8 is an exploded view of FIG. 6.

Referring to FIGS. 6 to 8, an example of one configuration of the radiation unit 160 applied to the present embodiment will be described below. FIG. 6 is a perspective view of a radiation unit, FIG. 7 is a sectional view taken along line Z-Z in FIG. 6 and FIG. 8 is an exploded perspective view of the radiation unit.

The radiation unit 160, as illustrated in FIG. 6, is constructed from the thermal diffusion member 161, the fin 162 and the radiation frame 163. On the left side of a paper face, there is an end of the unit and, on the right side, there is a center portion of the unit. Specifically, a heat input portion 161a of the thermal diffusion member 161 is positioned on the end side of the unit and a radiation portion 161b is positioned in the center of the unit. On the unit center side of the radiation unit 160, a protruding driver cover 164 is formed on the unit rear face and, inside the driver cover 164, there is stored a LED driver (drive circuit) (not illustrated) for supplying a signal for driving LED as the light source 131 to a wiring pattern formed on the light source-mounted substrate 132. In FIG. 3, the driver cover 164 is not illustrated.

The thermal diffusion member 161 is a member having high thermal conductivity and is constructed from, for example, heat pipe through which liquid such as water passes. In the present embodiment, a plurality of heat pipes are used as the thermal diffusion member 161. The heat pipe, as illustrated in FIGS. 6 and 8, is formed to extend by a predetermined distance in a horizontal direction from the unit end toward a driver cover 164 on the center side. The plurality of heat pipes are arranged in a perpendicular direction (vertical direction) of the radiation frame 163 and thereby the heat of the light source 131 transferred to the end of the chassis member 111 by the metal frame 133 enters the heat input portion 161a of the thermal diffusion member 161 which is a heat pipe and is transferred to the radiation portion 161b positioned on the unit center side.

The radiation frame 163, as illustrated in FIG. 8, is formed with a recess portion 165, into which the thermal diffusion member 161 is fitted, formed to be adaptable to positions of the plurality of thermal diffusion members 161 (heat pipes). The thermal diffusion member 161 is fitted into the recess portion 165 on the radiation frame 163 and the heat input portion 161a and the radiation portion 161b at both ends of the thermal diffusion member 161 are physically and thermally joined to the radiation frame 163, for example, by soldering or staking. Each of the fins 162 is fixedly retained on the radiation frame 163 by a screw (not illustrated). Further, the recess portion 165 is formed with an opening 166. Accordingly, as illustrated in the sectional view of FIG. 7, in the opening 166, the thermal diffusion member 161 is configured to be thermally direct contact with the fin 162 not through the metal member of the radiation frame 163.

Next, a radiation method of the heat generated from the light source 131 will be described below.

The heat generated from the light source 131 is transferred to the metal frame 133 through the light source-mounted substrate 132. For the light source-mounted substrate 132, use of ceramic having low thermal resistance facilitates transmission of the heat generated at the light source 131. The light source-mounted substrate 132 and the metal frame 133 are bonded to each other by thermal conduction adhesive 134, such as silver paste. Accordingly, the heat generated from the light source 131 is transferred to the metal frame 133 with high efficiency.

The radiation frame 163 and the chassis member 111 are fixedly retained on the metal frame 133 by the fixing screw 114. Accordingly, the heat transferred to the metal frame 133 is transferred to the chassis member 111, the radiation frame 163 and the thermal diffusion member 161 joined to the radiation frame 163 and, in each member, thermal conduction is performed in a unit center direction. Because the thermal conductivity of the thermal diffusion member 161 is far higher than those of the chassis member 111 and the radiation frame 163, a large portion of heat travels through the thermal diffusion member 161. Further, the heat travels through the radiation frame 163 joined to the thermal diffusion member 161. At this time, air passes through a space between the chassis member 111 provided with the fins 162 and the radiation frame 163 from downward toward upward of the liquid crystal display unit 1. Accordingly, the heat transferred to the radiation frame 163 and the thermal diffusion member 161 is radiated with high efficiency by the fins 162 fixedly retained on the radiation frame 163.

As described above, the large portion of heat generated from the light source 131 is transferred to the thermal diffusion member 161, but is partially transferred to the chassis member 111 as well and therefore temperature somewhat rises. To prevent the heat from being transferred to the optical guiding board 121, as described above, in the region A in the vicinity of the light source unit 130 of the chassis member 111, the protruding portion 190 is formed at the chassis member 111 and the space 191 is formed between the chassis member 111 and the optical guiding board 121 and the reflection sheet group 150 to store the thermal insulation member 112 in the space 191. Specifically, in the present embodiment, for the region A much affected by the heat from the light source 131, the thermal insulation member 112 is disposed between the chassis member 111 and the optical guiding board 121 and the reflection sheet group 150, thus preventing an adverse effect of heat onto the optical guiding board 121 or the reflection sheet group 150.

It is preferable to use the thermal insulation member 112 which has lower thermal conductivity than the chassis member 111, the optical guiding board 121 or the reflection sheet group 150, less thermal deformation and less thermal expansion, and such flexibility or elasticity not to give, when sandwiching is performed between the chassis member 111 and the optical guiding board 121 and the reflection sheet 150, a force (a stress) to the chassis member 111, the optical guiding board 121 and the reflection sheet 150. In the present embodiment, as the thermal insulation member 112 having such properties, sponge is used. A member made of any other materials may be used if the member has such properties. For example, plate-shaped rubber may be used.

The thickness of the thermal insulation member 112 is set to be equal to that of the stepped portion 111a of the chassis member 111. Thus, the thermal insulation member 112 operates as a member for supporting the reflection sheet group 150 and the optical guiding board 121 and therefore the thermal insulation member 112 has an effect of preventing the reflection sheet group 150 and the optical guiding board 121 from being deformed to the chassis member 111 side.

The heat transferred to the chassis member 111 is gradually radiated by the radiation unit 160 in transferring the heat in a central direction of the liquid crystal display unit 1. The heat of the chassis member 111 is sufficiently radiated in the region A and therefore heat quantity which the chassis member 111 has is small in the region B in the center direction from the stepped portion 111a. Accordingly, there occurs a minor effect of the heat which the reflection sheet group 150 and the optical guiding board 121 receive from the chassis member 111.

In the present embodiment, a size of the thermal insulation member 112 in a horizontal direction (horizontal direction of paper face in FIG. 3) is approximately 25 mm to 50 mm in the case of a 37-inch liquid crystal display panel 101. A thickness (dimension in a vertical direction of paper face in FIG. 3) thereof is approximately 1.0 to 2.0 mm. The size of the area A in a horizontal direction is a size large enough for the thermal insulation member 112 to be stored. For example, in view of radiation of the chassis member 111 and support of the optical guiding board 121, the size is set to be approximately 2% to 10% of that of the chassis member 111 in a horizontal direction.

Heat is transferred from the chassis member 111 to the radiation frame 163, mainly by the fixing screw 114. On the other hand, at any portion other than the fixing screw 114, the chassis member 111 and the radiation frame 163 are only in physical contact with each other and, between the chassis member 111 and the radiation frame 163, there is not such a member as to promote thermal transmission, such as a thermal conduction sheet having elasticity. Accordingly, at any portion other than the fixing screw 114, little thermal transfer is made between the chassis member 111 and the radiation frame 163 and the fixing screw 114 restrains the heat transferred from the chassis member 111 to the radiation frame 163 from returning to the chassis member 111 again. Accordingly, a temperature rise in the chassis member 111 (protruding portion 190) around the thermal insulation member 112 is restrained, thus thermally protecting the optical guiding board 121 and the reflection sheet group 150 more suitably.

Hence, the present embodiment provides a slim liquid crystal display unit having a large screen. In the present embodiment, the reflection sheet group 150 is constructed from three sheets: the first reflection sheet 151 and second reflection sheets 152 (one each in right/left direction), but may be constructed from only one reflection sheet or four or more sheets.

Second Embodiment

Referring next to FIGS. 9 to 13, a liquid crystal display unit according to a second embodiment of the present invention will be described below. One of the features of the present embodiment is that a reflective thermal insulation member formed with a reflecting surface on a surface on an optical guiding board side is used as a heat insulating member.

Figure 9:
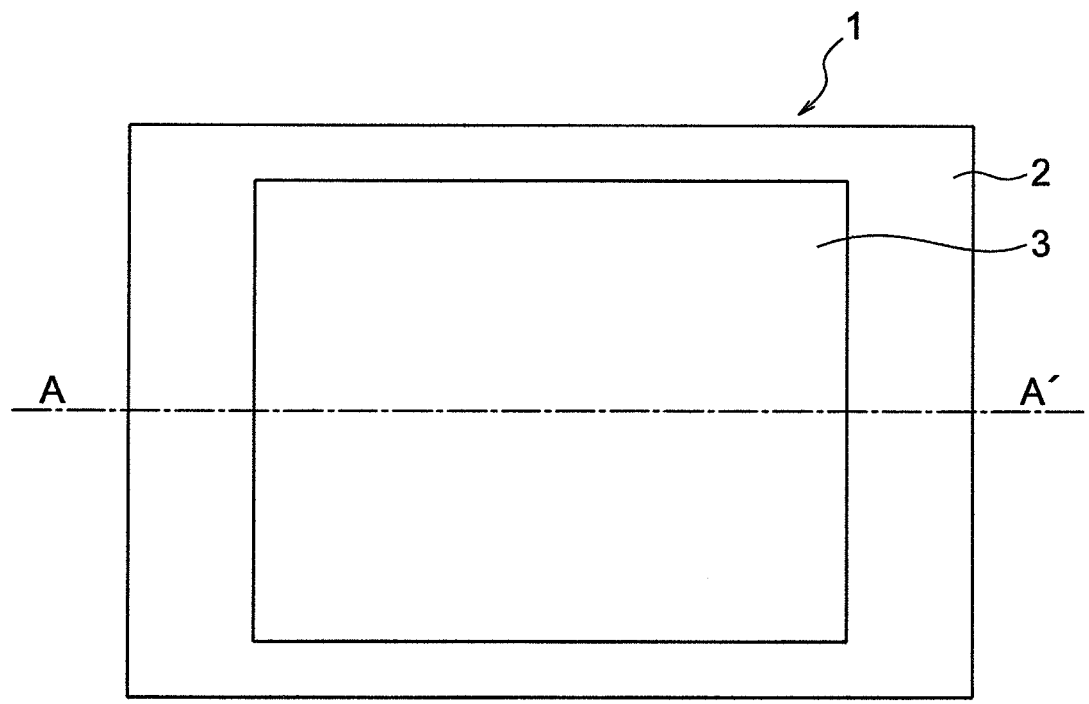
FIG. 9 is a schematic configurational view of a liquid crystal display unit according to a first embodiment of the present invention.
Figure 10:
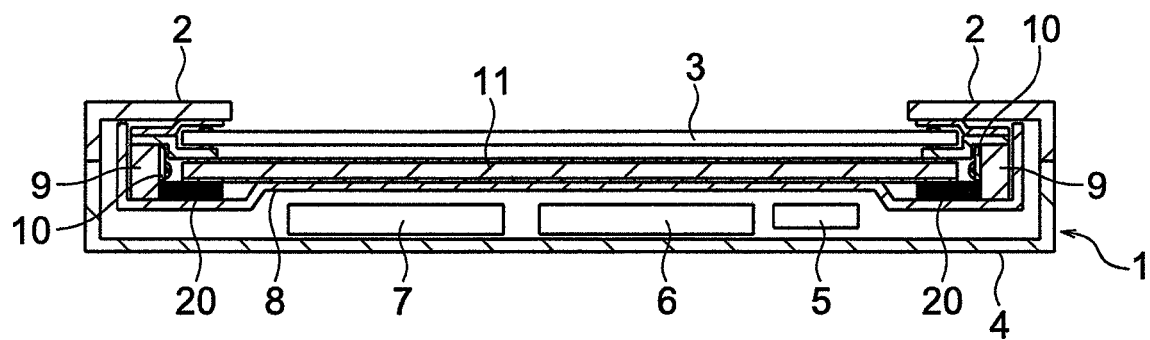
FIG. 10 is a schematic sectional view taken along line A-A' in FIG. 9 and a view illustrating a second embodiment of the present invention.

FIG. 9 is a schematic configurational view when the liquid crystal display unit according to the present embodiment is seen from a display face side. FIG. 10 is a sectional view taken along line A-A' in FIG. 1.

In the present embodiment, a vertical direction in FIG. 9 is defined as a vertical direction and a horizontal direction in FIG. 9 as a horizontal direction. In addition, a liquid crystal panel 3 side in FIG. 10 is defined as a front face side and a rear face cover 4 side in FIG. 10 as a rear face side.

As illustrated in FIG. 9, when a liquid crystal display unit 1 is seen from a display face side, a liquid crystal panel 3 is seen inside an appearance frame 2. As illustrated in FIG. 10, on a rear face side of the liquid crystal panel 3, a member typified by an optical guiding board 11 is laminated to uniformly guide the light to a liquid crystal panel rear face, and further on a surface rearward thereof, a chassis member 8 is disposed to retain the members from the rear face. A light source-mounted substrate 10 with a light source mounted is attached onto a metal frame 9 and further the metal frame 9 is fixed on the chassis member 8. On a rear face of the chassis member 8, electric circuit boards 5, 6, 7 are disposed as needed. On a rear face thereof, a rear face cover 4 is disposed and constitutes a housing of the liquid crystal display unit 1 together with the appearance frame 2.

The electric circuit boards 5, 6, 7 are, for example, a substrate for a driver for supplying electric current to a LED light source or a signal processing circuit for processing a display signal input into a liquid crystal display unit, a power supply circuit board for taking out required electric power from a commercial power source or a tuner circuit board in the case of a display unit for TV set or the like, however, the present invention is not particularly limited thereto.

The light source-mounted substrate 10 provided with a LED element as a light source is disposed on both end portions in a horizontal direction, and the light from the light source is launched from both end portions of the optical guiding board 11 and penetrates through the liquid crystal panel 3 from the front face of the optical guiding board 11 to form an image.

Figures 11, 12:
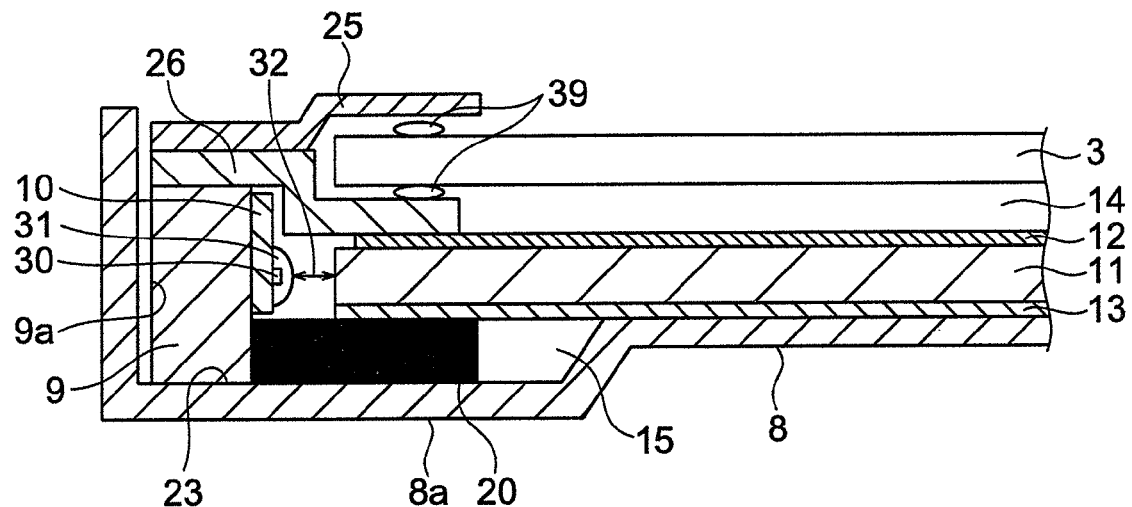
FIG. 11 is a schematic sectional view with an end portion in FIG. 10 enlarged.
FIG. 12 is a chart indicating a coefficient of linear expansion for each type of raw material.

FIG. 11 illustrates an enlarged view of an end portion in FIG. 10. For easy understanding of FIG. 10, the appearance frame 2, the rear face cover 4 and the electric circuit boards are not illustrated.

On the rear face of the liquid crystal panel 3, a panel clearance 14 exists as a space and further on the rear face an optical sheet group 12 including a diffusion sheet, the optical guiding boards 11, one or a plurality of reflection sheets 13 are disposed and retained from a rear face side by the chassis member 8. The panel clearance 14 has an effect of improving the uniformity of the light incident into the liquid crystal panel 3 from the optical guiding board 11 and preventing the liquid crystal panel 3 from damaging a surface of the optical sheet group 12 when the liquid crystal panel 3 is curved. The optical sheet group 12 improves the uniformity of the light from the optical guiding board 11 to the liquid crystal panel 3 and, as needed, a prism sheet for improving viewing angle properties is also laminated on this portion. One or more reflection sheets 13 prevent the light launched from the end portion of the optical guiding board 11 from being leaked to the rear face side and efficiently reflect the light to be directed toward the liquid crystal panel. The reflection sheet 13 uses a material formed by vapor-depositing aluminum in a mirror-face shape or applying white pigment over the whole surface of PET (polyethylene terephthalate) or PC (polycarbonate) sheet to increase reflectance.

The liquid crystal panel 3 is retained by a first frame 25 and a second frame 26 through a cushion 39 made of, for example, rubber. The cushion 39 has effects of relieving a force applied to the liquid crystal panel and of preventing damage to the liquid crystal panel. The second frame 26 has a function of pressing the optical sheet group 12 and the optical guiding board 11 from the front face side and is inserted into a space to the chassis member 8 or the reflective thermal insulation member 20 on the rear face side to retain the optical sheet group 12 and the optical guiding board 11.

A large amount of light sources 30, each of which is formed from, for example, LED element are arranged to be aligned on the light source-mounted substrate 10 in an approximately vertical direction (in FIG. 9). The outside of the light source 30 is covered with a lens 31. The lens 31 is provided to efficiently take out the light from the light source 30 in a direction of the optical guiding board. The lens 31 is made of, for example, transparent silicone resin having a high refraction factor and high heat resistance.

The light source-mounted substrate 10 provided with the light sources 30 is firmly fixed on a metal frame 9. To efficiently transmit heat generation of the LED element to the metal frame 9, preferably, grease or sheet having thermal conductivity is inserted between the light source-mounted substrate 10 and the metal frame 9 to ensure a close contact. More preferably, soldering is performed.

At an end portion, the chassis member 8 is formed with a protrusion portion 8a which extends laterally, from at least the metal frame 9 to a position overlapping at least parts of the optical guiding board 11 and the reflection sheet 13 and which protrudes to the rear face side of the liquid crystal display unit 1. Further, at the protrusion portion 8a, the metal frame 9 is firmly fixed onto the chassis member 8. To efficiently transmit heat from the metal frame 9 to the chassis member 8, a thermal conduction layer 23 is provided between a LED light source block and the chassis member. The thermal conduction layer 23 is, for example, grease or sheet having thermal conductivity and has a function of absorbing flatness variation in a stationary portion to suppress contact heat resistance. Alternatively, as the thermal conduction layer 23, the metal frame 9 and the chassis member 8 may be soldered to each other.

The metal frame 9 requires to efficiently transmit the heat of the light source-mounted substrate 10 to the chassis member. Preferably, the metal frame 9 is made of a material having high thermal conductivity, for example, aluminum or copper. In addition, preferably, the lateral thickness of the metal frame 9 is larger than at least that of the chassis member 8. Such a configuration enables higher thermal conductivity in the metal frame 9 and enlargement of an area of the thermal conduction layer 23 as a contact portion with the chassis member 8, thus suppressing heat resistance at the contact portion.

Bringing an end portion surface 9a of the metal frame into contact with the chassis member 8 can efficiently transmit heat to the chassis member, however, the present invention is not particularly limited thereto.

Preferably, the chassis member 8 is made of a material having high thermal conductivity to efficiently diffuse the heat transmitted from the metal frame 9 to on a face of the chassis member 8. The chassis member 8 requires strength high enough to retain members such as the optical guiding board 11. As a material which meets such conditions, the chassis member 8 uses aluminum, magnesium or the like. The chassis member 8 is bent to the front face side at the end portion, which provides effects such as improving strength and further diffusing the heat transmitted from the metal frame 9 to the chassis member 8 at the end portion.

The heat diffused at the chassis member 8 is transmitted to the rear face cover 4 or supplying cooling air between the rear face cover 4 and the chassis member 8, as needed, to be dissipated to the outside of the liquid crystal display unit 1.

Inside the protrusion portion 8a, the reflective thermal insulation member 20 is provided in a region extending from the end portion of the metal frame 9 to at least parts of the optical guiding board 11 and the reflection sheet 13. The reflective thermal insulation member 20 is structured in such a manner that a thickness thereof approximately meets a dimension (a protrusion amount of the liquid crystal display unit 1 in a depth direction) of an internal space of the protrusion portion 8a, so that the reflective thermal insulation member 20 can retain the optical guiding board 11 and the reflection sheet 13 from the rear face side at the end portion. Of particular importance, the reflection sheet 13 is thin and needs to be retained at the end portion: otherwise, the reflection sheet 13 may not maintain its planarity and may be warped to prevent the light from reflecting on the reflection sheet 13 at the end portion. In addition, the reflection sheet 13 has a function of thereby reflecting the light on the front face side and also a function of suppressing heat transfer in a thickness direction thereof.

As the reflective thermal insulation member 20, preferably, a reflecting surface is formed on the front face side (reflection sheet 13 side) and the rear face of the reflecting surface is a thermal insulation layer formed from at least a material and a member having lower thermal conductivity than that of the chassis member 8. Hence, light can be reflected on the front face side on which the light from the light source 30 of the reflective thermal insulation member 20 is directly made incident and the heat transmitted from the chassis member 8 side can be effectively insulated on the rear face side. The reflecting surface is formed by vapor-depositing aluminum in a mirror-face shape or applying white pigment in the same way as the reflection sheet 13. The thermal insulation layer can have a heat insulating function, provided that the heat insulating layer is made of resin such as PET or PC in the same way as the reflection sheet 13.

The thermal insulation layer formed from resin foam including air bubbles therein, such as sponge, is suitable because effective thermal conductivity is further thereby lowered, thus improving a heat insulating effect. In addition, the thermal insulation layer requires to have a function of suppressing heat transfer in the thickness direction, however, does not always require suppression of heat transfer in a face direction. For example, the heat insulating layer may be made of a material having heat transfer anisotropy and lower thermal conductivity in the thickness direction than in the face direction. As such a material, for example, resin compound material including fillers oriented in the face direction is proposed.

The reflective thermal insulation member 20 may be a laminated body of the reflection sheet 13 and a heat insulating member. In this case, the reflective thermal insulation member 20 can have the same refection properties as the reflection sheet 13 and, by the commonality of a member of the reflective thermal insulation member 20 across the reflection sheet 13 and the member, the reflective thermal insulation member 20 can be manufactured at a low cost. Further, the member of the thermal insulation layer can be selected independently of the reflective layer and therefore a thermal insulation layer having preferred heat insulating function can be formed.

The reflective thermal insulation member 20 is disposed at such a position as to come into approximate contact with the metal frame 9. The bottom face side thereof is firmly fixed onto the chassis member 8. As a fixing method, for example, double-faced tape may be used.

The reflective thermal insulation member 20 is firmly fixed onto the chassis member 8 and is made slidable on the reflection sheet 13 and the optical guiding board 11. Specifically, the reflective thermal insulation member 20 is structured to allow in-plane movement of the reflection sheet 13 and the optical guiding board 11 without any hindrance by only retaining them from the rear face side.

Preferably, the protrusion portion 8a of the chassis member 8 has a slight clearance 15 with the reflective thermal insulation member 20 stored therein. A wide space inside the protrusion portion 8a enough to form the clearance 15 can facilitate fixing the reflective thermal insulation member 20 on the chassis member for assembly even after the light source-mounted substrate 10 provided with the light source 30 is firmly fixed on the chassis member 8.

The metal frame 9 is disposed on the protrusion portion 8a of the chassis member 8 and hence the reflective thermal insulation member 20 is brought nearer to the metal frame 9 than a lens 21, thus being disposed at an approximately contact position. In consideration of incidence efficiency of light into an end portion of the optical guiding board 11, the light source 30 and the lens 31 are required to be at the approximately same position as the optical guiding board 11 in a perpendicular direction to a display face. Accordingly, if the metal frame 9 is not disposed at the protrusion portion 8a, no clearance can be ensured between the lens 31, the light source-mounted substrate 10 and the chassis member 8 nor the reflective thermal insulation member 20 is brought near the metal frame 9 to be disposed at an approximately contact position.

Between end portions of the optical guiding board 11 and the reflection sheet 13 and a lens 31, there is a predetermined clearance 32. This clearance 32 is primarily provided to prevent the optical guiding board 11 and the reflection sheet 13 from coming into contact with the lens 31 due to an impact applied by variations in manufacturing precision or external factors. Generally, enlargement of a member makes it difficult to ensure absolute dimensional accuracy and increases a deformation amount generated by an impact and therefore in enlarging the liquid crystal display unit 1, the size of the clearance 32 is also required to be increased.

A second reason for providing the clearance 32 is thermal expansion. Specifically, as described above, the chassis member 8 is made of metal such as aluminum to efficiently diffuse the heat from the light source to the inside of the chassis member 8. On the other hand, the optical guiding board 11 and the reflection sheet 13 are made of, for example, resin such as acryl, PET or PC. The rate of expanding (coefficient of linear expansion) depending upon a temperature of aluminum, acryl, PET or PC is almost as illustrated in FIG. 12 under a normal temperature condition. The coefficient of linear expansion of resin changes with molding conditions, however, those of acryl, PET and PC are generally much larger than that of metal.

Accordingly, when the temperature of a member is raised by operating the liquid crystal display unit 1, the member wholly expands. In particular, a resin member relatively significantly expands. When the liquid crystal display unit 1 is enlarged, the expansion is not negligible. For example, it is assumed that a horizontal width of the liquid crystal display unit 1 is 1.5 m and the temperature of a member becomes higher by 40° C. than in assembling. An expansion amount of aluminum is approximately 1.4 mm, while that of resin (acryl in FIG. 4 assumed) is 4.2 mm. Accordingly, a difference of approximately 2.8 mm occurs therebetween. Even when the optical guiding board 11 and the reflection sheet 13 are exactly positioned at a central portion of the liquid crystal display unit 1, an expansion difference of approximately 1.4 mm occurs at each of right and left end portions.

On the other hand, the metal frame 9 fixed with the light source 30 is fixed on the chassis member to efficiently transmit heat to the chassis member 8, and the light source 30 and the lens 31 are displaced, following the expansion of the chassis member 8. Accordingly, when the liquid crystal display unit 1 operates and the internal temperature rises, a clearance 32 between the lens 31 and the optical guiding board 11 and the reflection sheet 13 becomes smaller than in assembling due to thermal expansion. Further, when the liquid crystal display unit 1 repeats action and stop, the optical guiding board 11, the reflection sheet 13 and the chassis member 8 repeats sliding due to the difference of the thermal expansion and thereby a positional relationship thereof may gradually shift.

Accordingly, the clearance 32 is necessary for the first and second reasons described above and requires to increase the size of the liquid crystal display unit 1 with the enlargement thereof.

As described above, according to the present embodiment, at an end portion of the chassis member 8, the protrusion portion 8a extending from the metal frame 9 to at least parts of the optical guiding board 11 and the reflection sheet 13 is formed, the metal frame 9 is fixed on the protrusion portion 8a and there is formed, at the protrusion portion 8a, the reflective thermal insulation member 20 extending from the end portion of the metal frame 9 to at least parts of the optical guiding board 11 and the reflection sheet 13 and fixed on the chassis member 8 and hence the heat generated by the light source 30 can be effectively transmitted to the chassis member 8 through the light source-mounted substrate 10 and the metal frame 9 and diffused in the chassis member 8, thus effectively cooling the light source 30. At this time, the proximity on which particularly the metal frame 9 of the protrusion portion 8a of the chassis member is fixed becomes hot by the heat transmitted from the metal frame 9, however, the protrusion portion 8a of the chassis member 8, the optical guiding board 11 and the reflection sheet 13 are heat-insulated by the reflective thermal insulation member 20. Hence, an end portion temperature of the optical guiding board 11 can be prevented from becoming high, thus inhibiting thermal deterioration of the end portion of the optical guiding board 11.

As described above, particularly when the liquid crystal display unit 1 is enlarged, the clearance 32 between the optical guiding board 11 and the reflection sheet 13 and the lens 31 increases, which makes it difficult to bring the reflection sheet 13 into proximity to the lens 31. However, in the present embodiment, the reflective thermal insulation member 20 can reflect light even in proximity to the lens 31 without leaking the light to a rear face side, thus efficiently launching the light from the light source 30 into the optical guiding board 11. Particularly, even when a temperature in the liquid crystal display unit 1 rises and a relative positional relationship between the optical guiding board 11 and the reflection sheet 13 and the chassis member 8 is shifted at an end portion by thermal expansion, the reflective thermal insulation member 20 and the reflection sheet 13 are slid and thereby reflecting surface is always formed over the whole rear face side. Hence, the light can be reflected without being leaked to the rear face side and the light from the light source can be efficiently launched into the optical guiding board. The reflective thermal insulation member 20 and the reflection sheet 13 are partially overlapped and therefore even when the positional relationship is gradually shifted after a sliding operation due to a thermal expansion difference in the course of repeated action and stop operations of the liquid crystal display unit 1, a reflecting surface is always formed over the whole rear face side. Hence, the light can be reflected without being leaked to the rear face side and the light from the light source can be efficiently launched into the optical guiding board.

In particular, since the reflective thermal insulation member 20 is made into a member which is formed with a reflecting surface provided on a surface opposing to the liquid crystal panel 3 and which is formed with a thermal insulation layer provided on a side on which the reflective thermal insulation member is fixed on the chassis member 8, light is reflected on the front face side into which the light of the light source 30 of the reflective thermal insulation member 20 is made incident and the heat transmitted from the chassis member 8 side can be effectively insulated on the rear face side.

Further, as the thermal insulation layer, a material made of resin foam including air bubbles therein is suitable because effective thermal conductivity is further thereby lowered, thus improving a heat insulating effect.

Particularly, the reflective thermal insulation member 20, formed from a laminated body of a reflection sheet and an heat insulating member can have the same reflection properties as the reflection sheet 13 and inhibit unevenness of light due to a difference of the reflection properties. In addition, by the commonality of a member of a reflecting surface across the reflection sheet 13 and the member, the reflective thermal insulation member 20 can be manufactured at a low cost. A member of a thermal insulation layer can be selected regardless of adequacy of reflective layer formation. Hence, a thermal insulation layer having more preferred heat insulating properties can be formed.

According to the present embodiment, in the above way, there is provided a liquid crystal display unit having good optical properties which can efficiently make the light from the light source 30 incident into the optical guiding board 11, effectively cool the light source 30 constructed from LED elements even in a large-sized liquid crystal display unit 1 and can inhibit degradation in optical properties due to heat.

In the present embodiment, the light source 30 is disposed at an end portion in a horizontal direction, however, may be disposed at an end portion in a vertical direction, using a structure of the present embodiment. Generally, since the liquid crystal display unit is long in a horizontal direction, even when the light sources 30 (LED elements) of the same quantity are arranged to obtain the same quantity of light, the temperature of the light source 30 can be lowered because disposing the light sources at an end portion in a vertical direction decreases the mounting density of the light sources 30 more significantly. Otherwise, in a larger-sized liquid crystal display unit, the light source 30 can be cooled.

By arranging the light sources 30 at both of the end portions in a vertical and a horizontal directions, a structure of the present embodiment can be applied. In this case, the mounting density of the light source 30 decreases more significantly and therefore the temperature of the light source 30 can be further lowered. Otherwise, the light source 30 can be cooled in a larger-size liquid crystal display unit.

Third Embodiment

Next, a liquid crystal display unit according to a third embodiment of the present invention will be described below.

Figure 13:
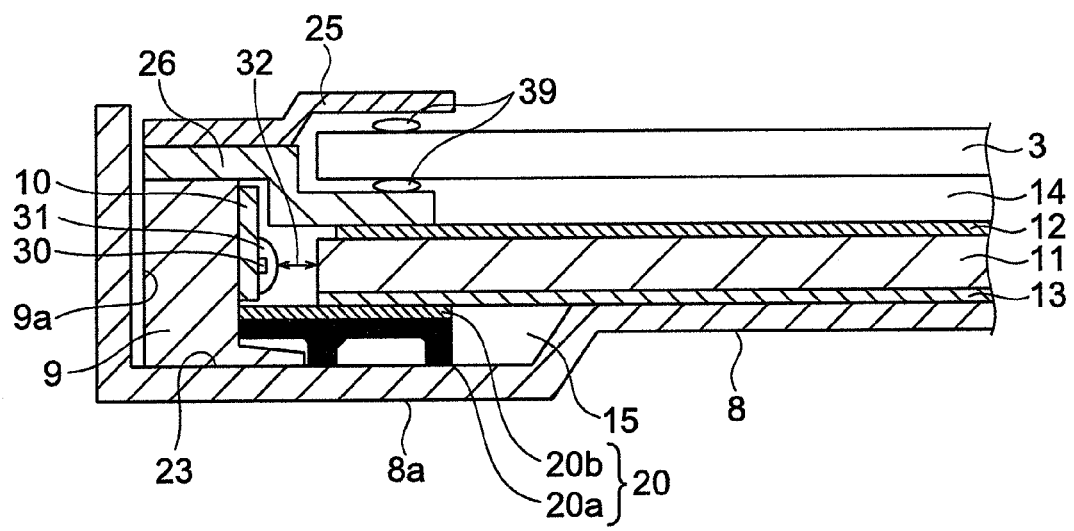
FIG. 13 is a schematic sectional view of a third embodiment of the present invention.

FIG. 13 is a schematic sectional view of an end portion of a liquid crystal display unit according to a third embodiment and corresponds to FIG. 12 in a second embodiment illustrated in FIGS. 9 to 12. Just as in FIG. 12, for easy understanding of figures, any of an appearance frame, rear face cover and electric circuit board is not illustrated.

The present embodiment is the same as the second embodiment illustrated in FIGS. 9 to 12 except a metal frame 9 and a reflective thermal insulation member 20. The reflective thermal insulation member 20 has a reflection sheet 20b on the front face side and is constructed from a laminated body of a member 20a a part of which is hollow on the rear face side. Preferably, the member 20a is made of resin, particularly for high heat resistance. Such a member 20a can be easily manufactured by, for example, a resin mold. The metal frame 9 is configures in such a manner that a portion fixed onto a chassis member 8 has an approximately folding-fan shape extending toward an optical guiding board 11 as compared to a portion on which a light source-mounted substrate 10 is mounted. A reflection sheet 20b is made of the same material as the reflection sheet 13 disposed on the rear face of the optical guiding board 11 and thereby the reflective thermal insulation member 20 can have the same reflection properties as the reflection sheet 13 and the reflection sheet 13 and the member can be commonalized for manufacture of the reflective thermal insulation member 20 at a low cost, however, the present invention is not particularly limited thereto. For example, a surface having a reflection function may be formed on the front-face side of the member 20a.

In addition to the second embodiment illustrated in FIGS. 9 to 12, the present invention provides the following advantages: A hollow portion is formed at least at a part of a side where the reflective thermal insulation member 20 is fixed onto the chassis member 8 and thereby high heat insulation can be obtained by the low thermal conductivity of air in the hollow portion, which in turn inhibits temperature rise in the end portion of the optical guiding board 11 better than the second embodiment illustrated in FIGS. 9 to 12. Therefore, thermal deterioration of the end portion of the optical guiding board 11 can be further inhibited.

As illustrated in the second embodiment, formation of a thermal insulation layer from resin foam can also decrease an effective thermal conductivity. However, formation of a hollow portion from a shape of a member as in the present invention not only can obtain higher heat resistance, but also prepare a member having high shape dimensional accuracy by a resin mold unlike resin foam and increase the rigidity of the member as compared to resin foam. Hence, at the end portion, the optical guiding board 11 and the reflection sheet 13 can be surely retained.

As illustrated in FIG. 13, the rear face side of the member 20a is made hollow at a position where the metal frame 9 and the reflective thermal insulation member 20 come into approximate contact, thus extending a portion fixed on the chassis member 8 of the metal frame 9 toward the optical guiding board 11. Hence, an area of a fixing portion of the chassis member 8 and the metal frame 9 can be increased, thermal resistance between the metal frame 9 and the chassis member 8 can be suppressed and thereby the heat from the light source 30 can be effectively diffused to the chassis member 8.

Fourth Embodiment

Figure 14:
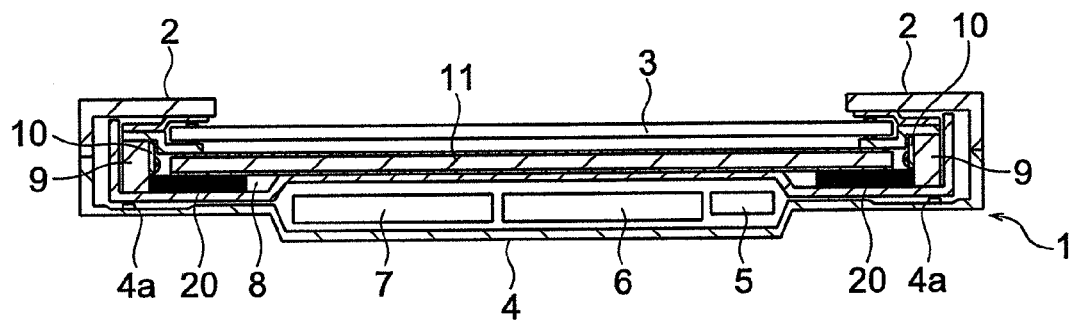
FIG. 14 is a schematic sectional view of a fourth embodiment of the present invention.

Next, a liquid crystal display device according to a fourth embodiment of the present invention will be described below. FIG. 14 is a schematic sectional view of the fourth embodiment and corresponds to that of FIG. 10 in the second embodiment illustrated in FIGS. 9 to 12.

The present embodiment is almost the same as the second embodiment illustrated in FIGS. 9 to 12 except that a rear face cover 4 has a different shape. Electric circuit boards 5, 6, 7 are arranged at an approximately center portion in the inside of a protrusion portion 8a (a center side of a display area). The rear face cover 4, while accommodating the electric circuit boards 5, 6, 7 in the approximately center portion, faces a chassis member 8 at the end portion at which a metal frame 9 is disposed, and is extruded to the front side almost in proximity thereto. In addition, the rear face cover 4 has a rear face cover protrusion portion 4a. The rear face cover protrusion portion 4a is provided on such a side as to face the chassis member 8 in vicinity to a position at which the metal frame 9 is fixed. The rear face cover protrusion portion 4a is not required to be positioned in one position respectively at the end portions. A plurality of protrusion portions may be used as the rear face cover protrusion portion 4a in consideration of strength, formability or the like of the rear face cover 4.

As described in Second Embodiment, the heat of the light source transmitted to the chassis member 8 is diffused inside a panel surface and then is transmitted to the rear face cover 4 and dissipated to outside air. Otherwise, the heat is dissipated to the outside of the liquid crystal display unit 1 by introducing cooling air into between the rear face cover 4 and the chassis member 8 as necessary. In the present embodiment, the rear face cover 4 faces the chassis member 8 at the end portions and is extruded to the front side almost in proximity thereto and therefore the cooling air cannot enter between the rear face cover 4 and the chassis member 8 at the end portions. However, the cooling air may enter the approximately center portion accommodating the electric circuit boards 5, 6, 7 as required.

The present embodiment provides the following advantages in addition to those of the second embodiment.

First, in the present embodiment, the electric circuit boards 5, 6, 7 are arranged inside the protrusion portion 8a at an approximately center portion (a center side of a display area). The rear face cover 4 accommodates the electric circuit boards 5, 6, 7 in the approximately center portion, faces the chassis member 8 at the end portions and is extruded to the front side almost in vicinity thereto. This can reduce the thickness of the liquid crystal display unit to become thinner at the end portions. By disposing the electric circuit boards 5, 6, 7 inside the protrusion portion 8a (the center side of the display area), the electric circuit boards are not overlapped with the protrusion portion 8a and hence the thickness of the liquid crystal display unit can be regulated at an approximately center portion. Further, since the rear face cover 4 is extruded to the front side almost in proximity to the chassis member 8 at the end portion, a clearance between the protrusion portion 8a and the rear face cover 4 becomes smaller, thereby enabling the heat to be efficiently transmitted. Hence, the heat transmitted from the light source 30 to the metal frame 9 and the chassis member 8 can be efficiently dissipated from the rear face.

In addition, by forming the rear face cover protrusion portion 4a on such a side as to face the chassis member 8 in proximity to a portion where the metal frame 9 of the rear face cover 4 is fixed, the rear face cover 4 can be inhibited from having a locally high temperature in proximity to the portion where the metal frame 9 is fixed. In the chassis member 8, the portion in proximity to where the metal frame 9 is fixed has the highest temperature because a high temperature of the metal frame 9 is transmitted directly thereto. Accordingly, in the absence of the rear face cover protrusion portion 4a, the rear face cover 4 and the chassis member 8 are in proximity to each other at the end portion and therefore the high temperature is transmitted to the rear face cover 4 and the rear face cover 4 has a locally high temperature. From the viewpoint of heat dissipation from the rear face cover 4 to outside air, it is preferred to be heated to a high temperature, however, high temperature causes problems, such as a human getting burned by touching. Therefore, the temperature of the rear face cover 4 is required to be kept at a constant temperature or less.

In vicinity to the portion where the metal frame 9 is fixed, formation of the rear face cover protrusion portion 4a can suppress the heat transmitted from the chassis member 8 to the rear face cover, thus preventing the rear face cover from having a locally high temperature. The temperature of the chassis member 8 is the highest in vicinity to the portion where the metal frame 9 is fixed. However, the heat is spread over the surface of the chassis member 8 and hence the temperature gradually decreases with an increase in a distance from the proximity of the metal frame 9. Accordingly, the formation of the rear face cover protrusion portion 4a inhibits the rear face cover from being heated to a high temperature at a portion of the rear face cover protrusion portion 4a. In the portion except the rear face cover protrusion portion 4a, where the temperature lowers, the rear face cover 4 is brought near the chassis member 8 to positively transmit heat to the rear face cover, thus making a temperature distribution of the rear face cover 4 uniform. This enables to keep a wholly high temperature while suppressing the rear face cover 4 from having a locally high temperature and to effectively dissipating the heat from the rear face cover 4 to outside air.

The rear face cover protrusion portion 4a is formed inside the liquid crystal display unit 1, which has no effect upon the appearance of the rear face of the liquid crystal display unit 1 and achieves effective heat dissipation, thereby providing the liquid crystal display unit 1 with desirable appearance.

As described above, the present embodiment provides further slimness of the liquid crystal display unit and the efficient heat dissipation from the rear face cover 4 to outside air. This provides a slim liquid crystal display unit capable of lowering temperatures of the light source 30 and the end portion of an optical guiding board 11 and attaining good optical properties.

As described above, in the present embodiment, the chassis member 8 has the optical guiding board 11 and the protrusion portion 8a extending to at least a part of reflection sheet 13. Further, inside the protrusion portion 8a, there is provided a reflective thermal insulation member 20 which extends from the end portion of the metal frame 9 to at least portions of the optical guiding board 11 and the reflection sheet 13 and is fixed to the chassis member 8. This provides a large-sized liquid crystal display unit capable of efficiently making the light from the light source 30 into the optical guiding board 11, effectively cooling down the light source 30, suppressing degradation of the optical properties of the optical guiding board 11 due to heat and attaining good optical properties.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A liquid crystal display unit with a liquid crystal panel comprising:
a light source disposed on an end side of the liquid crystal panel to apply light from the end side toward a center side of the liquid crystal panel;

an optical guiding board disposed on a rear face side of the liquid crystal panel and guiding the light from the light source to a display face side of the liquid crystal panel;

a chassis member disposed on a rear face side of the optical guiding board and supporting the optical guiding board; and a thermal conductor for transferring the heat of the light source to the chassis member, wherein a thermal insulation member is attached between a predetermined region on an end side of the chassis member and the optical guiding board.

2. The liquid crystal display unit according to claim 1, wherein a stepped portion is formed at the chassis member to form a space for storing the thermal insulation member between the predetermined region on the end side of the chassis member and the optical guiding board.

3. The liquid crystal display unit according to claim 1, wherein a reflection sheet for reflecting the light passing through the light source or the optical guiding board toward the liquid crystal panel side is attached between the rear face side of the optical guiding board and the thermal insulation member and the chassis member.

4. The liquid crystal display unit according to claim 1, wherein a radiation unit for radiating heat of the chassis member is attached to a rear face of the chassis member.

5. The liquid crystal display unit according to claim 4, wherein the radiation unit includes a radiation frame in contact with a rear face of the chassis member end side in a predetermined region, a fin attached onto a rear face of a center portion of the chassis member and a thermal diffusion member in contact with the radiation frame and the fin.

6. The liquid crystal display unit according to claim 5, wherein the thermal diffusion member is a heat pipe for passing liquid therethrough, the heat of the chassis member end side in a predetermined region is transferred to the radiation frame and the heat transferred to the radiation frame is transferred to the fin through the heat pipe and hence the heat of the light source is diffused to the center portion of the chassis member through the heat pipe.

7. The liquid crystal display unit according to claim 1, wherein the light source is a plurality of light emitting diodes.

8. The liquid crystal display unit according to claim 1, wherein the light source is disposed on one or both of right and left end sides of the liquid crystal panel.

9. The liquid crystal display unit according to claim 1, wherein the light source is disposed on one or both of upper and lower end sides of the liquid crystal panel.

10. The liquid crystal display unit according to claim 1, wherein the thermal insulation member is a reflective thermal insulation member having a function capable of reflecting light.

11. A liquid crystal display unit with a liquid crystal panel comprising:

a light source disposed on right and left end sides of the liquid crystal panel to apply light from both right and left ends toward a center portion of the liquid crystal panel;

an optical guiding board disposed on a rear face side of the liquid crystal panel and guiding the light from the light source to a display face side of the liquid crystal panel;

a chassis member disposed on a rear face side of the optical guiding board and supporting the optical guiding board; and a thermal conductor for transferring the heat of the light source to the chassis member, wherein a portion in the vicinity of an end portion, at which the light source is disposed, of the chassis member is made into a protruding portion protruding to a rear face side of the liquid crystal display unit and a thermal insulation member for preventing the heat transferred from the light source to the end of the chassis member from transferring to the optical guiding board is attached in a space between the chassis member formed by the protruding portion and the optical guiding board.

12. The liquid crystal display unit according to claim 11, wherein the thermal insulation member is sponge.

13. The liquid crystal display unit according to claim 11, wherein the thermal insulation member is made of a foamed resin including therein air bubbles.

14. A liquid crystal display unit comprising: a liquid crystal panel; a LED light source disposed on at least one end portion of a display face thereof, a LED light source block provided with the LED light source; an optical guiding board guiding, to the liquid crystal panel, the light from the LED light source disposed on an rear face side of the liquid crystal panel; a reflection sheet provided on a rear face side of the optical guiding board; and a chassis member for fixing the LED light source block and retaining the optical guiding board and the reflection sheet from a rear face side, wherein at an end portion on which the LED light source block of the chassis member is disposed, there is provided: a protrusion portion extending at least from the LED light source block to at least parts of the optical guiding board and the reflection sheet; and a reflective thermal insulation member provided on the protrusion portion and fixed to the chassis member, extending from the end portion of the LED light source block to at least parts of the optical guiding board and the reflection sheet.

15. The liquid crystal display unit according to claim 14, wherein the reflective thermal insulation member is formed with: a reflecting surface provided on a face opposing to the liquid crystal panel; a heat insulating layer provided on a side where the reflection thermal insulation member is fixed on the chassis member.

16. The liquid crystal display unit according to claim 14, wherein the reflective thermal insulation member is formed from a laminated body of the reflection sheet and a thermal insulation member.

17. The liquid crystal display unit according to claim 14, wherein the reflective thermal insulation member is formed with: a reflecting surface provided on a face opposing to the liquid crystal panel; a hollow portion provided in at least a part of a side on which the reflective thermal insulation member is fixed on the chassis member.

18. The liquid crystal display unit according to claim 14, wherein reflective thermal insulation member is in slidable contact with the optical guiding board and the reflection sheet.

19. A liquid crystal display unit with a liquid crystal panel comprising:

a light source disposed on an end side of the liquid crystal panel to apply light from the end side toward a center side of the liquid crystal panel;

an optical guiding board disposed on a rear face side of the liquid crystal panel and guiding the light from the light source to a display face side of the liquid crystal panel;

a chassis member disposed on a rear face side of the optical guiding board and supporting the optical guiding board;

a thermal conductor for transferring the heat of the light source to the chassis member;

a driver for driving the light source, wherein the chassis member is formed therein with a protruding portion projected toward the rear surface side of the liquid crystal display unit, in a region near to the end side of the liquid crystal panel, at which the light source is located, so as to define a space between the chassis member and the optical guiding board within the thus formed protruding portion, there being a thermal insulation member attached in the space for preventing a heat transmitted to the end side of the chassis member from the light source, from being transmitted to the optical guiding board, and the driver is disposed on the rear face of the chassis member at a center side of the liquid crystal display unit being off from the thermal insulation member and the protruding portion.

20. The liquid crystal display unit according to claim 19, further comprising:

a light source-mounted substrate on which the light source is mounted, wherein the thermal conductor is formed of a metal frame which is coupled thereto with both light source-mounted substrate and chassis member so as to transmit a heat from the light source to the chassis member through the intermediary of the metal frame.

* * * * *